May 14, 1957 C. B. McBRIDE ET AL 2,792,075
APPARATUS FOR SEPARATING SUSPENDED MIST PARTICLES FROM GASES
Filed June 22, 1954
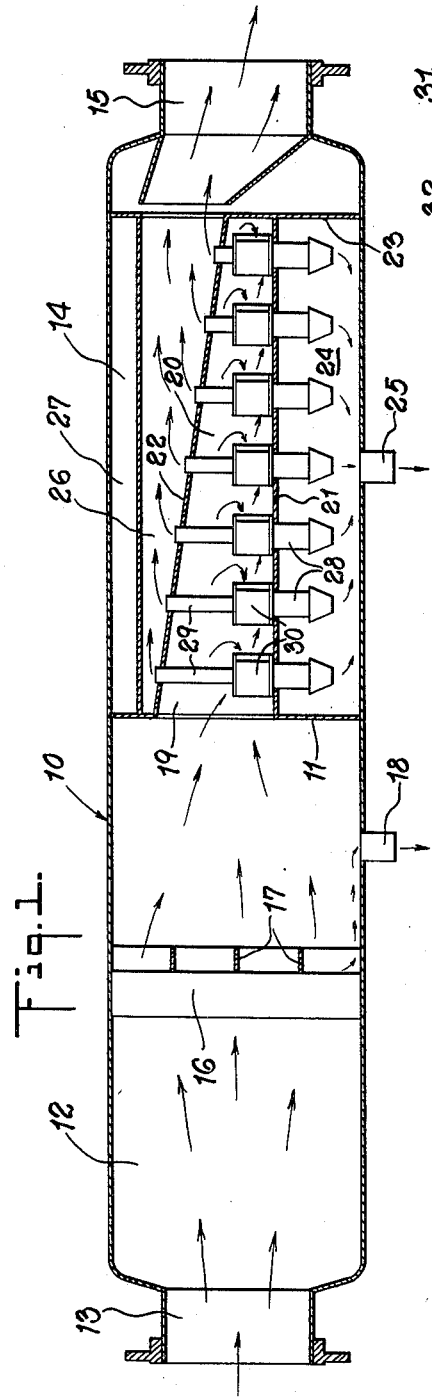
Fig. 1.
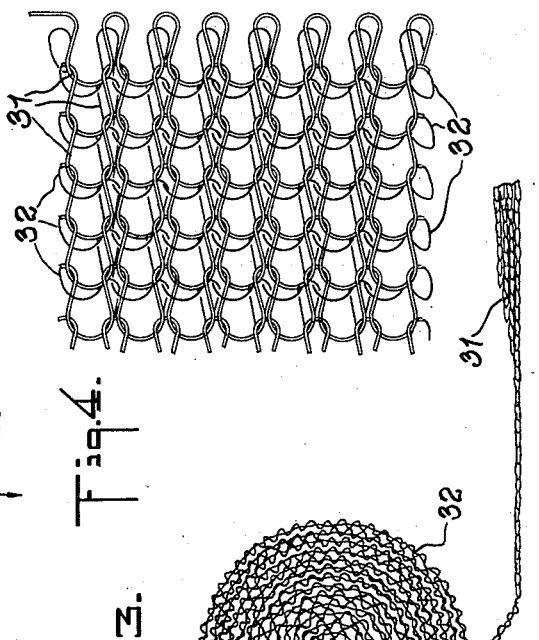
Fig. 4.
Fig. 3.
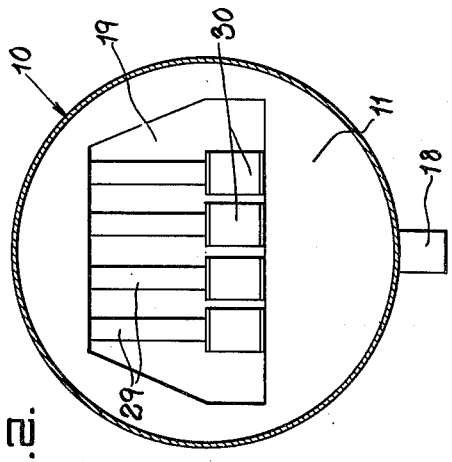
Fig. 2.
INVENTORS
CHARLES B. McBRIDE
PHILIP F. BEST
BY
Benj. T. Rauber
ATTORNEY United States Patent Office 2,792,075
Patented May 14, 1957

2,792,075

APPARATUS FOR SEPARATING SUSPENDED MIST PARTICLES FROM GASES

Charles B. McBride, Portchester, N. Y., and Philip F. Best, Riverside, Conn., assignors to The Thermix Corporation, Greenwich, Conn., a corporation of Connecticut Application June 22, 1954, Serial No. 438,382

1 Claim. (Cl. 183—34)

Our invention relates to an apparatus for separating mist particles or droplets from gases, particularly from natural gas. It may also be used for separating mists of various kinds from air or other gases.

Multitube centrifugal separators have been used for separating suspended mist particles from natural gas. There are, however, some mists which, due to some characteristics of the mist not entirely known, are very difficult to separate and collect by centrifugal means alone. One of these mists is an amine mist formed in natural gas conditioning plants where the amine is used to remove the sulphur content of "sour" gas to make it acceptable for consumption. Also difficult to separate and collect are mist particles having diameters of less than one micron, which are too small to separate in centrifugal separators.

Our present invention provides an apparatus for separating mists of the above and similar types from natural gas and from other gases.

In our invention the fine, suspended, droplets of mist are conditioned or agglomerated into larger masses or droplets which are then separated from the gas centrifugally as, for example, by passing the gas and suspended, agglomerated, droplets through a multitube centrifugal separator. These separators may be similar to those heretofore used in separating suspended particles from gases.

The specific agglomerating element comprises a pad formed of layers of knitted metal wire of small gauge. The knitted layer is a flat sheet of interknitted loops of wire, the dimensions of the loops being, for example, about ¼ inch. The sheets or layers of the knitted wire may be placed one on another to form a pad of the required thickness, for example, about four inches, or a strip of the required width may be rolled or wound into a tight coil. A pad of this construction has a large number of small, tortuous, passages on which the smallest droplets impinge and are retained when a mist laden gas passes therethrough. Mats of this type have been used to collect and separate suspended liquids from the distilled vapors in stills, distilling columns and fractionating columns in which the passage of the vapors is sufficiently slow to permit the suspended liquid particles separated in the meshes of the mat to drop or drain back into the still or to the bottom of the column. Such pads are not capable of efficiently separating mist particles from large volumes of gases, such as natural gas, in which the velocity is necessarily very high, the particles passing through the pad without significant separation.

We have found, however, that in passing through a pad of the above type the finer and the difficult to separate particles have been conditioned or agglomerated so that they may be efficiently separated by multitube centrifugal separators. Thus while neither element alone is effective in separating and collecting these difficult mist particles, the mutually co-operative actions of both elements provide very effective separation.

The various features of our invention are illustrated by way of example in the accompanying drawings in which:

Fig. 1 is a longitudinal, vertical, section of a separator embodying a preferred form of the invention, Fig. 2 is a cross section of the separator taken on line 2—2 of Fig. 1, Fig. 3 is an elevation of a part of an agglomerating or conditioning pad showing the manner in which the layers are wound to form the pad, and, Fig. 4 is a plan or face view of a part of a strip of woven wire to be wound into a pad.

In the embodiment of the invention shown in Figs. 1 and 2 the separating elements are mounted within a gas tight housing 10 preferably a welded, cylindrical structure divided by a transverse partition 11 into an agglomerating or conditioning compartment 12 having an axially positioned inlet 13 and a centrifugal separating compartment 14 having an axially positioned outlet 15.

Extending transversely across the agglomerating compartment is a pad of coiled, knitted wire layers 16 backed by a supporting grid 17 of any suitable construction to which the pad is secured. The pad 16 spans the space in the agglomerating compartment and closely fits the cylindrical interior surface thereof so that mist laden gas passing through the compartment must pass through the tortuous passages of the pad. A drain outlet 18 is provided in the lower part of the agglomerating compartment back of the pad through which any liquid settling out of the gas or draining from the pad may be removed.

The partition 11 is provided with an opening 19 of the shape shown in Fig. 2 through which the mist laden gas may pass from the agglomerating compartment into the separating compartment 14. The gas passing from the compartment 12 through the opening 19 is received in a chamber 20 formed by a horizontal partition 21, a downwardly sloping upper partition 22, a pair of side partitions, not indicated, and a transverse partition 23 near the outlet end of the compartment. A chamber 24 is also formed by the partitions 11, 21 and 23 to receive separated liquid and is provided with a draw-off outlet 25. An outlet chamber 26 is also formed between the partitions 22, 19 and a partition 27 spaced above the partition 22 and opens to the outlet 15. The downward slope of the partition 22 causes the chamber 20 to taper and the chamber 26 to expand toward the outlet end of the compartment.

Mounted in the partition 21 are a number of centrifugal separators each comprising a tube 28 mounted in the partition 21 and extending and delivering into the liquid receiving chamber 24 and an offtake pipe 29 mounted in the partition 22 to extend axially into the upper, receiving end of the tube 28 and delivering into the offtake chamber 26. An annular space is formed in the upper or inlet end of the tube 28 about the offtake pipe 29 into which the particle laden gas passes from the chamber 20 through rotatory passages, that is, passages that give the entering gas a swirling or rotary movement about the outlet pipe projecting into the tube. These rotatory passages may be formed in any manner well known in the art such as by inclined vanes or by tangential vanes as indicated at 30. The suspended liquid is thrown outwardly by the centrifugal force of the rotary movement of the gas to the inner surface of the tube and the gas feed of the suspended liquid then enters the end of the offtake pipe and passes to the offtake chamber 26. The chamber 20 acts as a plenum chamber to supply the centrifugal separators.

An agglomerating pad of knitted wire filaments as described is preferred as the agglomerator element not only because of the resulting stiffness and stability of the resulting pad but because also of the fine, uniform gas passages of low resistance to flow and because the metal, being a good electrical conductor and in contact with the metal housing and grounded by the gas mains, readily discharges any static electrical charges on the suspended particles.

In the operation of the apparatus the gas therefore enters through the inlet 13 into the agglomerating chamber 12 and then passes through the small, tortuous passages formed about the metal wires or filaments. The suspended liquid in the gas impinges on the surfaces of the filaments, any static electrical charges being discharged. Some of the liquid that impinges on the filaments of the pad may flow down to the bottom of the compartment and be withdrawn through the drain outlet 18. The greater part of the impinged liquid, however, is torn from the pad by the velocity of the gas, passing with the gas in agglomerated, larger masses to the centrifugal separators. The centrifugal separators are most efficient at high velocities. At low velocities the agglomerating effect of the pad 16 is greater, forming larger agglomerates which are more easily separated in the centrifugal separators. The actions of the pad and of the centrifugal tubes therefore complement each other for variations of speed of the gases.

An agglomerating mat constructed as shown in Figs. 3 and 4 is especially suited for our invention. In this construction wire 31 of small gauge, a few thousandths of an in inch in diameter, is knitted with loops of about ¼ inch length in circular loom of a circumference equal to twice the thickness of the pad and then flattened to form a double layer or two ply ribbon with smooth selvedges 32. This two ply ribbon is then wound tightly into a coil of the desired diameter.

Having described our invention, we claim:

Apparatus for separating suspended liquid particles from a stream of gas which comprises a cylindrical housing having an inlet at one end and an outlet at the opposite end, a transverse partition dividing said housing into an agglomerating compartment at the inlet end of the housing and a separating compartment at the outlet end, a pad of layers of knitted metal filaments spanning said agglomerating compartment, longitudinally extending partitions dividing said separating compartment into a plenum chamber opening from said agglomerating compartment, a liquid receiving chamber and an offtake chamber delivering to said outlet and centrifugal separators in said separating compartment, each comprising a tube mounted in the partition between said plenum chamber and said liquid receiving chamber to receive gas from said plenum chamber and to deliver separated liquid to said liquid receiving chamber, an open ended offtake pipe extending axially into the gas receiving end of its respective tube to form an annular space therein at said end and opening at its opposite end into the offtake chamber, each said tube having a rotatory inlet from said plenum chamber into said annular space.

References Cited in the file of this patent

UNITED STATES PATENTS

| | | |
|---|---|---|
| 1,544,950 | Smith | July 7, 1925 |
| 2,070,073 | Walton | Feb. 9, 1937 |
| 2,117,718 | Hawley | May 17, 1938 |
| 2,274,684 | Goodloe | Mar. 3, 1942 |
| 2,399,509 | Rich | Apr. 30, 1946 |
| 2,521,785 | Goodloe | Sept. 12, 1950 |
| 2,544,395 | Polk | Mar. 6, 1951 |

FOREIGN PATENTS

| | | |
|---|---|---|
| 686,779 | Great Britain | Jan. 28, 1953 |